United States Patent [19]
Ahn

[11] Patent Number: 5,845,834
[45] Date of Patent: Dec. 8, 1998

[54] VCR HAVING A CAPSTAN BRAKE DEVICE

[75] Inventor: Seong-Ick Ahn, Seoul, Rep. of Korea

[73] Assignee: Daewoo Electronics Co., Ltd., Seoul, Rep. of Korea

[21] Appl. No.: 719,029

[22] Filed: Sep. 24, 1996

[30] Foreign Application Priority Data

Sep. 30, 1995 [KR] Rep. of Korea .................. 95-33454

[51] Int. Cl.⁶ .................. B65H 20/00; G03B 1/04; B60T 13/04
[52] U.S. Cl. .................. 226/178; 188/166; 226/188; 242/354
[58] Field of Search .................. 226/13, 38, 178, 226/188; 242/354, 354.2; 360/93, 96.4; 188/72.9, 72.7, 166, 17

[56] References Cited

U.S. PATENT DOCUMENTS

| | | | |
|---|---|---|---|
| 3,191,834 | 6/1965 | Nakauchi | 226/38 |
| 3,684,147 | 8/1972 | Ysbrand et al. | 226/178 |
| 3,708,040 | 1/1973 | Hollnagel | 188/72.9 X |
| 4,351,498 | 9/1982 | Iwata et al. | 242/354.2 |
| 4,757,885 | 7/1988 | Kronich | 188/166 X |
| 4,951,164 | 8/1990 | Yasaka et al. | 360/85 |
| 5,472,151 | 12/1995 | Choi et al. | 242/356.4 |
| 5,691,858 | 11/1997 | Lee et al. | 360/85 |

*Primary Examiner*—Michael Mansen
*Attorney, Agent, or Firm*—Beveridge, DeGrandi, Weilacher & Young, LLP

[57] ABSTRACT

A VCR having a capstan brake device has a flywheel having a friction plane on the lower portion thereof. The flywheel is installed to one end of a capstan shaft piercing through a chassis, and a brake member is installed to one side of the flywheel for swinging toward the friction plane. The brake member is installed with a hinge-coupled fixing rod and a fixedly-coupled operating rod and support rod. The support rod sets the brake member to an applying state by a spring, and the operating rod sets the brake member to a releasing state by a cam having a guide groove and an operating groove. Thus, rotating speed of the flywheel is constantly decelerated, and the operation of the brake member is promptly and accurately carried out.

11 Claims, 2 Drawing Sheets

VCR HAVING A CAPSTAN BRAKE DEVICE

BACKGROUND OF THE INVENTION

1. Field of the Invention

The present invention relates to a capstan brake device employed to the interior of a video cassette recorder (VCR), and more particularly to a VCR having a capstan brake device capable of constantly decelerating rotating speed of a flywheel installed to a capstan shaft when a slow motion picture is reproduced.

2. Description of the Prior Art

A capstan brake device within a conventional VCR is constructed such that a brake member swinging by involving an elastic force is closely attached to an outer periphery of a flywheel of a capstan shaft. When a slow motion picture is reproduced, the brake member is closely attached to the outer periphery for decelerating speed of the flywheel to constantly decelerate the travelling speed of a tape.

However, the conventional capstan brake device having the above-described construction decelerates the rotating speed by means of a frictional force at the outer periphery of the flywheel to be difficult to obtain the constant decelerating speed. Furthermore, operating elements for swinging the brake member is so many to heighten manufacturing cost and lower working productivity.

SUMMARY OF THE INVENTION

Therefore, the present invention is devised to solve the foregoing problems. It is an object of the present invention to provide a VCR having a capstan brake device accurately operated by a small number of operating elements while constantly decelerating rotating speed of a flywheel of a capstan apparatus.

To achieve the above object of the present invention, a VCR having a capstan brake device includes a flywheel connected to one end of a capstan shaft piercing through a capstan hole of a chassis and having a friction plane on a lower portion thereof. One side of the flywheel is installed with a brake member for swinging toward the friction plane. Also, a fixing rod has one end fixed to the lower portion of the chassis, and the other end thereof is hinge-coupled to the brake member. Here, the brake member swings by a swing unit.

Preferably, the brake member is installed with a pad on one end thereof for increasing a frictional force at an area of closely attaching to the friction plane.

It is preferable that fixing rod is hinge-coupled to a central area of the brake member, and the swing unit includes an operating rod of which one end is fixed between the hinge and pad of the brake member and the other end passes through a center hole formed in the chassis to be over by a predetermined height. In addition to the operating rod, the swing unit has a cam for pressing the other end of the operating rod by as many as the predetermined height, and an elastic member installed between the brake member and chassis.

Here, one plane of the cam is rotated by being closely attached to the chassis, and is formed with a guide groove fitted with the other end of the operating rod and an operating groove deeper than the guide groove in a portion of the guide groove.

More preferably, the guide groove may be shaped as a predetermined circular arc having a predetermined angle with respect to an axial line of the cam, and the operating groove may be formed at an end of the arc of the guide groove.

Also, a bottom plane of the guide groove is slanted toward the operating groove.

Preferably, the elastic member includes a support rod which has one end fixed to the other end of the brake member and the other end forming a hook after passing through a side hole formed in the chassis, and a spring which is installed between the brake member and chassis.

At this time, the support rod may be installed to pass through the center of the spring.

Alternatively, to achieve the above object of the present invention, a VCR having a capstan brake device includes a flywheel connected to one end of a capstan shaft piercing through a capstan hole of a chassis and having a friction plane on a lower portion thereof. Then, a brake member installed to one side of the flywheel swings toward the friction plane, and is installed with a pad on an area of closely attaching to the friction plane for increasing a frictional force. A fixing rod of which one end is fixed to the lower portion of the chassis has the other end hinge-coupled to a central area of the brake member, and an operating rod of which one end is fixed between the hinge and the pad of the brake member has the other end passing through a center hole formed in the chassis to be over by a predetermined height. A cam has one plane rotating by being closely attached to the chassis, in which the plane closely attached to the chassis is formed with a guide groove. Here, the guide groove shaped as a predetermined circular arc has a predetermined angle with respect to an axial line thereof and is fitted with the other end of the operating rod and having a slanted bottom plane toward the end of the arc. In addition to the guide groove, an operating groove is formed in a portion of the guide groove to be deeper than the guide groove for pressing the other end of the operating rod by as many as the predetermined height. A spring is installed between the brake member and chassis, and a support rod has one end fixed to the other end of the brake member and the other end forming a hook after passing through the center of the spring and a side hole formed in the chassis.

When the speed of the flywheel is decelerated in the VCR having the capstan brake device according to the present invention constructed as above, the cam is rotated to permit the operating rod to seat onto the interior of the operating groove. The brake member allows the pad to closely attach to the friction plane of the flywheel while acting as a lever. By this operation, the rotating speed of the flywheel is decreased.

If the capstan brake is intended to be released, the cam is rotated counter-clockwise to seat the operating rod into the guiding groove. By doing so, the operating rod begins descending, and the pad becomes separated from the friction plane.

The VCR having the capstan brake device as described above is advantageous in that the operation thereof is prompt and accurate since the braking member is operated directly by the cam while the decelerating speed of the flywheel can be constantly maintained. By these advantages, it is effective in reproducing the slow motion picture of better quality to be presented to a viewer, and enhancing assembling productivity.

U.S. Pat. Nos. 4,376,503 and 5,295,617 disclose inventions relating to capstan apparatuses similar to that according to the present invention.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

A VCR having a capstan brake device according to the present invention will be described in detail with reference to FIGS. 1, 2 and 3.

Figure 1:
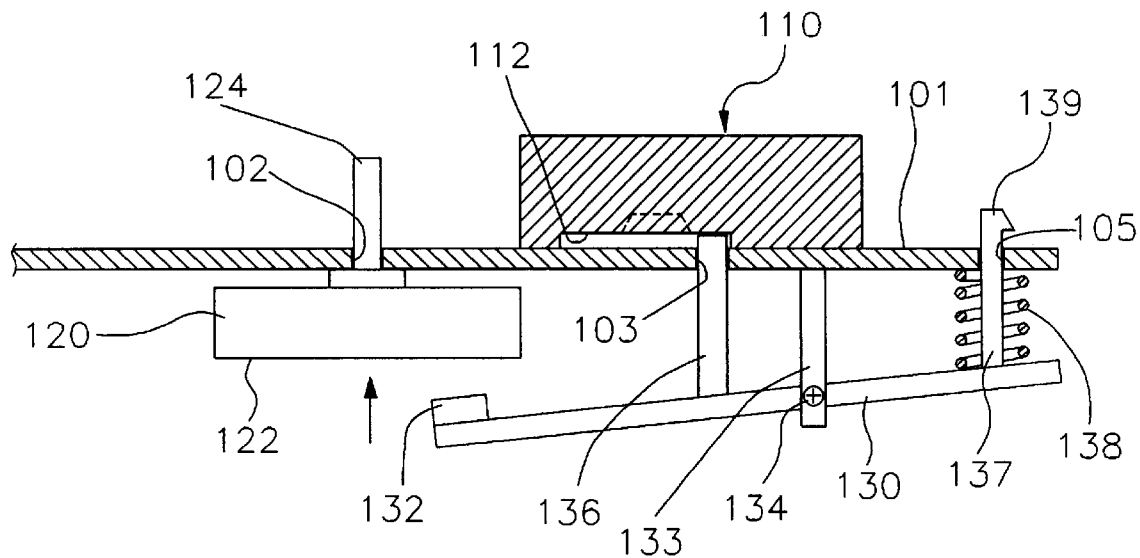
FIG. 1 is a view showing an operating state that a capstan brake device of a VCR having a capstan brake device according to the present invention is released.
Figure 2:
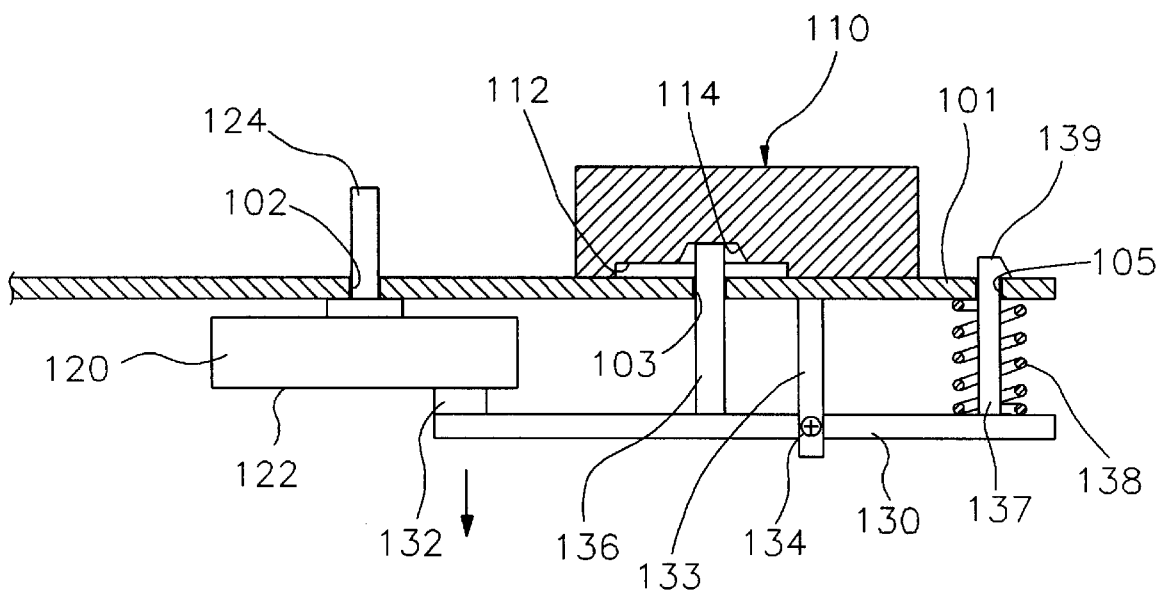
FIG. 2 is a view showing an operating state of applying the capstan brake device shown in FIG. 1.

FIG. 1 is a view showing an operating state that a capstan brake device of a VCR having a capstan brake device according to the present invention is released, and FIG. 2 is a view showing an operating state of applying the capstan brake device shown in FIG. 1. Referring to FIG. 1, a brake member 130 swings in the direction designated by an arrow to be shifted from a releasing state to an applying state. In FIG. 2, brake member 130 is shifted from the applying state to the releasing state when swinging in the direction designated by an arrow.

As shown in FIGS. 1 and 2, a chassis 101 is formed with a capstan hole 102 of a predetermined dimension, and a capstan shaft 124 penetrates through capstan hole 102. A flywheel 120 incorporated with a great inertia is attached to an end of capstan shaft 124 for constantly maintaining rotating speed of capstan shaft 124. A friction plane 122 is formed on the lower surface of flywheel 120 in the circumferential direction.

Brake member 130 is attached with a pad 132 for enlarging a friction coefficient on an area closely contacting with friction plane 122, and is installed with a hinge 134 for supporting the swing motion of brake member 130 at the central area.

One end of a fixing rod 133 is connected to brake member 130 by means of hinge 134, and the other end thereof is fixed to the lower plane of chassis 101.

One end of a support rod 137 is fixed to the other end of brake member 130, and the other end thereof passes through a side hole 105 formed through the center of a cylindrical spring 138 and chassis 101 to constitute a hook 139. Here, hook 139 is formed such that a sloped plane is provided in the direction of inserting support rod 137 into side hole 105 to be easily assembled to chassis 101, but inserted support rod 137 is difficult to be separated therefrom due to hook 139. Spring 138 is installed between the lower plane of chassis 101 and brake member 130 under the constrained state, and support rod 137 pierces through the central axial line direction of the cylindrically-shaped spring 138.

One end of operating rod 136 is installed to brake member 130, and the other end thereof passes through a center hole 103 to project over the upper surface of chassis 101 by a predetermined height. The portion of being connected with brake member 130 is an area in the midst of an area installed with pad 132 and an area installed with hinge 134.

A cam 110 fitted with the other end of projecting operating rod 136 is installed to the upper plane of chassis 101. A guide groove 112 and an operating groove 114 formed by a deep-set lower plane of cam 110 are formed where cam 110 is in contact with the upper plane of chassis 101.

Figure 3:
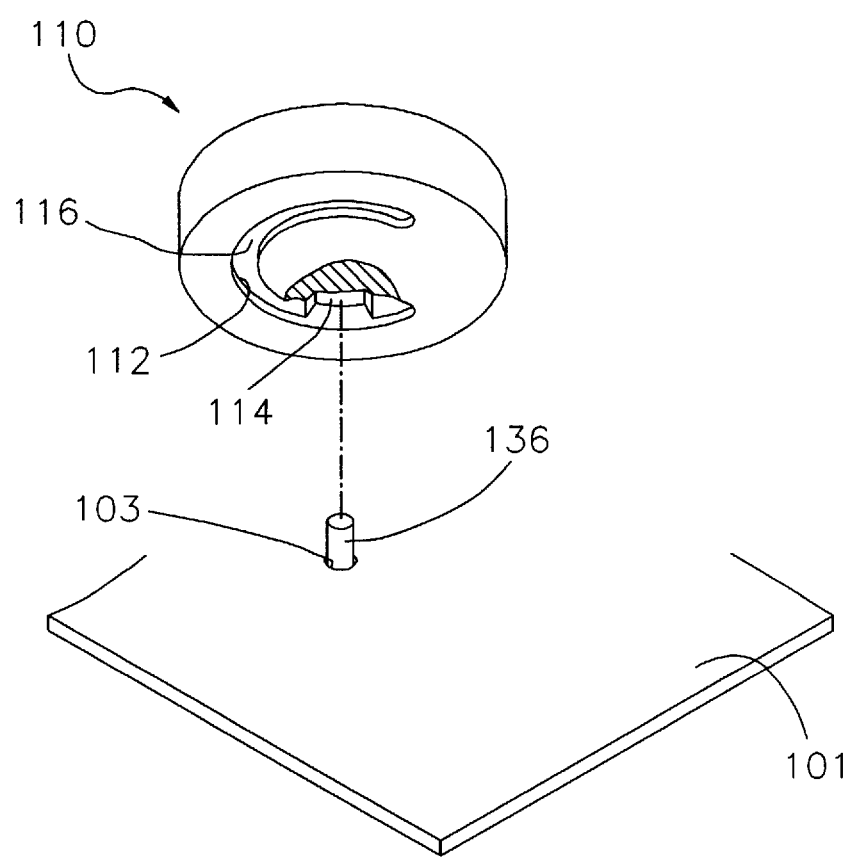
FIG. 3 is an exploded perspective view showing the cam of the VCR having the capstan brake device according to the present invention.

FIG. 3 is an exploded perspective view showing the cam of the VCR having the capstan brake device according to the present invention. As shown in FIG. 3, guide groove 112 and operating groove 114 are formed in the plane where cylindrically-shaped cam 110 is in contact with chassis 101. Also, cam 110 is installed to be rotatable by being closely attached to the upper plane of chassis 101 by a cam driving apparatus (not shown).

Guide groove 112 forms a circular arc of a predetermined angle centering about a rotation axial line of cam 110, has a width slightly greater than a diameter of operating rod 136 for being capable of being fitted with operating rod 136 therein, and has a bottom plane 116 formed to be flat while forming a predetermined inclination from the end of one arc side toward the end of another arc side.

Operating groove 114 is placed to the deep area in the circular arc of guide groove 112. The dent is significantly deeper than that of guide groove 112 to clearly define the boundary of operating groove 114 and guide groove 112, and an indenting distance is slightly greater than the diameter of operating rod 136.

An operation and effect of the VCR having the capstan brake device according to the present invention constructed as above is as below.

When the capstan brake device is to be shifted from the releasing state to the applying state, the following operation is carried out.

Cam 110 is rotated to place operating rod 136 having been positioned into guide groove 112 into operating groove 114. Then, brake member 130 swings centering about hinge 134 by an elasticity of spring 138 while operating rod 136 ascends. By this operation, pad 132 is closely attached to friction plane 122, and a frictional force is produced to decelerate the rotating speed of flywheel 120 and capstan shaft 124.

If the capstan brake device is to be shifted from the applying state to the releasing state, the following operation is carried out.

Cam 110 is rotated counter-clockwise to place operating rod 136 having been positioned into operating groove 114 into guide groove 112. Then, brake member 130 swings backward centering about hinge 134 by overcoming the elasticity of spring 138 while operating rod 136 gradually descends. By this operation, pad 132 is separated from friction plane 122, and flywheel 120 and capstan shaft 124 become freely rotated.

As a result, the VCR having the capstan brake device according to the present invention is effective in that the rotating speed of the flywheel can be constantly decelerated, and the operation of the brake member is promptly and accurately performed. In addition, a small number of elements are required to lower manufacturing cost and enhance assembly productivity.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A VCR having a capstan brake device comprising:
   a flywheel being formed integrally with a capstan shaft extending through a capstan hole of a chassis, said flywheel having a friction plane on a lower portion thereof;

a brake member installed to one side of said flywheel for swinging toward said friction plane;

a fixing rod having one end fixed to the lower portion of said chassis, and the other end hinge-coupled to said brake member; and swing means for swinging said brake member.

2. The VCR having a capstan brake device as claimed in claim 1, wherein said brake member is installed with a pad on one end thereof for applying a frictional force to said friction plane.

3. The VCR having a capstan brake device as claimed in claim 1, wherein said fixing rod is hinge-coupled to a central area of said brake member.

4. The VCR having a capstan brake device as claimed in claim 1, wherein said swing means comprises:

an operating rod having one end fixed to said brake member, and a second end passing through a center hole formed in said chassis;

a rotatable cam in engagement with said end of said operating rod; and an elastic member installed between said brake member and said chassis.

5. The VCR having a capstan brake device as claimed in claim 4, wherein one plane of said cam is formed with a guide groove in engagement with said second end of said operating rod said guide groove defining an operating groove in a portion of said guide groove, said operating groove being deeper than said guide groove.

6. The VCR having a capstan brake device as claimed in claim 5, wherein said guide groove is shaped as a predetermined circular arc having a predetermined angle with respect to an axial line of said cam.

7. The VCR having a capstan brake device as claimed in claim 6, wherein said operating groove is formed at an end of said arc of said guide groove.

8. The VCR having a capstan brake device as claimed in claim 7, wherein said predetermine angle of said guide groove increases in the direction of said operating groove.

9. The VCR having a capstan brake device as claimed in claim 4, wherein said elastic member comprises:

a support rod having one end fixed to one end of said brake member, said support rod extending through a side hole formed in said chassis; said support rod having a hood at its other end, and a spring installed between said brake member and said chassis.

10. The VCR having a capstan brake device as claimed in claim 9, wherein said support rod passes through the center of said spring.

11. A VCR having a capstan brake device comprising:

a flywheel being formed integrally with a capstan shaft extending through a capstan hole of a chassis, said flywheel having a friction plane on a lower portion thereof;

a brake member installed to one side of said flywheel for swinging toward said friction plane, said brake member having a pad at one end thereof for applying a frictional force;

a fixing rod having one end fixed to the lower portion of said chassis, and a second end hinge-coupled to a central area of said brake member;

an operating rod having one end fixed to said brake member between said fixing rod and said pad on said brake member, and a second end of said operating rod passing through a center hole formed in said chassis;

a rotatable cam mounted on said chassis, and having a surface in engagement with said second end of said operating rod, said cam surface formed with a guide groove shaped as a predetermined circular arc having a predetermined angle with respect to an axial line thereof, said second end of said operating rod extending into said guide groove, said guide groove having its bottom surface slanted toward one end of said arc, the depth of said guide groove being deepest at said one end of said arc, said guide groove defining an operating groove formed in a portion of said guide groove at said one end of said arc, said operating groove being deeper than said guide groove;

a spring installed between said brake member and said chassis; and a support rod having one end fixed to an end of said brake member, end forming a hook after passing through said support rod disposed in the center of said spring and having a second end extending through a side hole formed in said chassis, said second end formed in the shape of a hook.

* * * * *